(12) United States Patent
Suzuki et al.

(10) Patent No.: US 11,512,852 B2
(45) Date of Patent: Nov. 29, 2022

(54) REGENERATION COOLER OF RAMJET ENGINE, AND MANUFACTURING METHOD OF THE SAME

(71) Applicant: MITSUBISHI HEAVY INDUSTRIES, LTD., Tokyo (JP)

(72) Inventors: Kenji Suzuki, Tokyo (JP); Makoto Minoya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 294 days.

(21) Appl. No.: 16/498,033

(22) PCT Filed: Nov. 16, 2017

(86) PCT No.: PCT/JP2017/041348
§ 371 (c)(1),
(2) Date: Sep. 26, 2019

(87) PCT Pub. No.: WO2018/189944
PCT Pub. Date: Oct. 18, 2018

(65) Prior Publication Data
US 2020/0386186 A1  Dec. 10, 2020

(30) Foreign Application Priority Data
Apr. 10, 2017 (JP) .............................. JP2017-077377

(51) Int. Cl.
*F23R 3/00* (2006.01)
*F02K 7/10* (2006.01)
*F23R 3/40* (2006.01)

(52) U.S. Cl.
CPC ............... *F23R 3/005* (2013.01); *F02K 7/10* (2013.01); *F23R 3/40* (2013.01)

(58) Field of Classification Search
CPC .................................... F23R 3/005; F23R 3/40
See application file for complete search history.

(56) References Cited

U.S. PATENT DOCUMENTS 2,655,786 A    10/1953 Carr
3,925,983 A *  12/1975 LaBotz ..................... F02K 9/64
                                                          60/265

(Continued)

FOREIGN PATENT DOCUMENTS

EP    0 589 679    3/1994
EP    2 233 727    9/2010

(Continued)

OTHER PUBLICATIONS

International Search Report dated Jan. 10, 2018 in International (PCT) Application No. PCT/JP2017/041348.

(Continued)

*Primary Examiner* — Lorne E Meade
(74) *Attorney, Agent, or Firm* — Wenderoth, Lind & Ponack, L.L.P.

(57) ABSTRACT

A regeneration cooler (2) includes a passage forming structure (10) in which a fuel passage (11) is formed for liquid fuel to be supplied. A coating (12, 12A) is formed in the fuel passage (11) to at least partially cover a wall surface of the fuel passage (11). The coating (12, 12A) contains metal particles (13) adhered and fixed to the wall surface (11a) of the fuel passage (11) and a coating material (14, 17).

6 Claims, 5 Drawing Sheets

(56) References Cited

U.S. PATENT DOCUMENTS

| | | | |
|---|---|---|---|
| 5,826,422 | A | 10/1998 | Koyama et al. |
| 5,873,236 | A | 2/1999 | Koyama et al. |
| 5,987,878 | A | 11/1999 | Koyama et al. |
| 6,182,442 | B1 | 2/2001 | Schmidt et al. |
| 6,358,040 | B1 | 3/2002 | Pfefferle et al. |
| 6,394,791 | B2 | 5/2002 | Smith et al. |
| 6,472,014 | B1* | 10/2002 | Matsuba .............. C23C 4/02 |
| | | | 427/202 |
| 6,752,623 | B2 | 6/2004 | Smith et al. |
| 7,874,060 | B2* | 1/2011 | Ulmer .............. B29D 11/00596 |
| | | | 29/527.2 |
| 10,156,362 | B2 | 12/2018 | Suzuki |
| 10,190,540 | B2 | 1/2019 | Suzuki et al. |
| 2001/0046650 | A1 | 11/2001 | Smith et al. |
| 2002/0197578 | A1 | 12/2002 | Smith et al. |
| 2006/0181743 | A1* | 8/2006 | Ulmer .............. B29D 11/00596 |
| | | | 358/474 |
| 2010/0175379 | A1 | 7/2010 | Liu et al. |
| 2012/0000819 | A1* | 1/2012 | Matsushita ............ C10G 47/16 |
| | | | 208/111.01 |
| 2013/0312384 | A1 | 11/2013 | Hwang |
| 2014/0208767 | A1 | 7/2014 | Suzuki et al. |
| 2016/0109134 | A1 | 4/2016 | Suzuki |

FOREIGN PATENT DOCUMENTS

| | | |
|---|---|---|
| JP | 06-167245 | 6/1994 |
| JP | 08-189380 | 7/1996 |
| JP | 11-270409 | 10/1999 |
| JP | 2003-528283 | 9/2003 |
| JP | 2005-105906 | 4/2005 |
| JP | 2010-159761 | 7/2010 |
| JP | 2011-152527 | 8/2011 |
| JP | 2013-185492 | 9/2013 |
| JP | 2014-145328 | 8/2014 |
| JP | 2016-79862 | 5/2016 |
| JP | 2016-529187 | 9/2016 |
| JP | 2016-180062 | 10/2016 |

OTHER PUBLICATIONS

Extended European Search Report dated Feb. 5, 2020 in corresponding European Patent Application No. 17905551.2.
Notice of Reasons for Refusal dated Apr. 28, 2020 in counterpart JP Application No. 2017-077377 with Machine Translation.
International Preliminary Report on Patentability and Written Opinion of the International Searching Authority dated Oct. 15, 2019 in International (PCT) Application No. PCT/JP2017/041348.

* cited by examiner

○ : METAL PARTICLE 13

REGENERATION COOLER OF RAMJET ENGINE, AND MANUFACTURING METHOD OF THE SAME

TECHNICAL FIELD

The present invention relates to a regeneration cooler of a ramjet engine and a manufacturing method of the same.

BACKGROUND ART

In a ramjet engine (e.g. a scramjet engine), a regeneration cooler is sometimes provided to cool a wall surface of a combustion chamber with liquid fuel and to heat the liquid fuel with heat from the combustion chamber to generate vaporized fuel. A fuel passage is formed in the regeneration cooler to supply the liquid fuel. A heat exchange is carried out between the liquid fuel flowing through the fuel passage and a combustion gas flowing through the combustion chamber, so that the wall surface of the combustion chamber is cooled and the vaporized fuel is generated from the liquid fuel. The regeneration cooler has an advantage in which the cooling of the wall surface of the combustion chamber and the generation of the vaporized fuel can be realized in a compact structure.

In the regeneration cooler, thermal decomposition reaction occurs in which hydrocarbon of a large number of carbons contained in the liquid fuel is decomposed into hydrocarbon of a small number of carbons. When the thermal decomposition reaction is to be progressed intentionally, such a thermal decomposition reaction is sometimes called fuel reforming. When the fuel reforming is carried out, the regeneration cooler is sometimes configured to promote the thermal decomposition reaction by bringing the liquid fuel or vaporized fuel into contact with catalyst. The regeneration cooler having such a configuration is disclosed in, for example, JP 2016-079862A.

The inventor is considering controlling the thermal decomposition reaction in the regeneration cooler by forming a coating film on the fuel passage. A desirable degree of progress of the thermal decomposition reaction depends on application of the ramjet engine.

For example, it is sometimes desirable to restrain the progress of thermal decomposition reaction, depending on the application of the ramjet engine. On the other hand, the regeneration cooler is often formed of a metal which can withstand a high temperature, e.g. a Ni-based alloy. Such a metal has a function of promoting the thermal decomposition reaction to a certain extent although being not as much as catalyst. Therefore, when the thermal decomposition reaction is to be restrained, it is desirable to form the coating film on the fuel passage to restrain the thermal decomposition reaction.

On the other hand, it is sometimes desirable to promote the thermal decomposition reaction depending on the application of the ramjet engine. In such a case, it is desirable to form a coating film containing catalyst to promote the thermal decomposition reaction on the fuel passage. JP 2014-145328A discloses a structure in which the coating film containing the catalyst is formed on the fuel passage.

One problem is in the difficulty of forming of a coating film on the fuel passage of the regeneration cooler. The regeneration cooler is often formed of a metal material which has the low adhesion of coating film. In such a case, the peeling of coating film can occur. The peeling of coating film is not desirable because it is possible to become a cause by which the fuel passage is choked.

Therefore, the technical needs exist in the improvement the certainty of forming of coating film on the fuel passage of the regeneration cooler.

Note that JP 2011-152527A discloses the structure of catalyst carrier holding the metal catalyst (containing catalyst of platinum group metal).

CITATION LIST

[Patent Literature 1] JP 2016-079862A
[Patent Literature 2] JP 2014-145328A
[Patent Literature 3] JP 2011-152527A

SUMMARY OF THE INVENTION

Therefore, an object of the present invention is to improve the certainty of forming of coating film on a fuel passage of a regeneration cooler of a ramjet engine. The other objects and new features of the present invention would be understood by a skilled person from the following disclosure.

In an aspect of the present invention, a regeneration cooler used in a ramjet engine is provided.

The regeneration cooler includes a passage forming structure inside which a fuel passage supplied with a liquid fuel is formed. A coating is formed to at least partially cover a wall surface of the fuel passage. The coating contains metal particles adhered and fixed to the wall surface of the fuel passage and coating material.

In an example, the coating material contains a material to restrain thermal decomposition reaction of the liquid fuel, compared with a material of the passage forming structure. For example, it is desirable that the coating material contains at least one of silica, alumina and zirconia.

In another example, the coating material may contain catalyst to promote the thermal decomposition reaction of the liquid fuel.

In an example, it is desirable that the metal particles are formed of a material identical with that of the passage forming structure.

In an example, the coating material is formed as a coating material film to at least partially coat the wall surface of the fuel passage and the metal particles adhered and fixed to the wall surface.

In another example, the coating material may be formed as the coating material particles.

In another aspect of the present invention, a method of manufacturing a regeneration cooler of a ramjet engine is provided. The manufacturing method includes preparing a first meal plate; preparing a second metal plate which has a proximal section and a plurality of wall sections connected with the proximal section and in which a ditch is formed between every adjacent two of the plurality of wall sections; welding the first metal plate with the plurality of wall sections of the second metal plate to close the ditches by the first metal plate in a condition that metal particles are put in the ditches; and forming a coating material film of a coating material to at least partially coat the wall surface of each of the fuel passages formed to close the ditches by the first metal plate in the welding and the metal particles adhered and fixed to the wall surface in the welding.

In another aspect of the present invention, a method of manufacturing a regeneration cooler of a ramjet engine includes preparing a first meal plate; preparing a second metal plate which has a proximal section and a plurality of wall sections connected with the proximal section and in which a ditch is formed between every adjacent two of the plurality of wall sections; welding the first metal plate with the plurality of wall sections of the second metal plate to close the ditches by the first metal plate in a condition that metal particles, coating material particles formed of a coating material and a binder are put in the ditches; and removing a part of the metal particles and the coating material particles which is not adhered and fixed to the wall surfaces of the fuel passages formed by closing the ditches by the first metal plate.

According to the present invention, it is possible to improve the certainty of forming the coating film on the fuel passages of the regeneration cooler of the ramjet engine.

DESCRIPTION OF EMBODIMENTS

Figure 1:
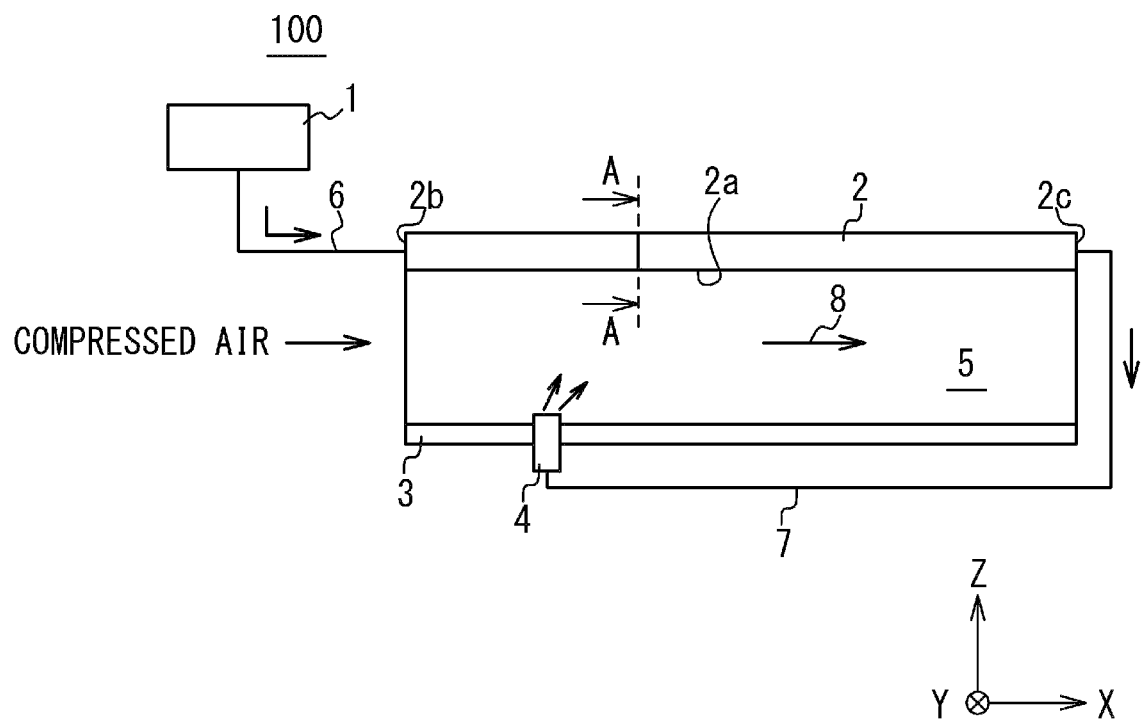
FIG. 1 is a block diagram showing a configuration of ramjet engine containing a regeneration cooler.

Hereinafter, embodiments of the present invention will be described with reference to the attached drawings. Note that a size ratio of components shown in the drawing differs from an actual size ratio to facilitate the understanding of the present invention.

First Embodiment

FIG. 1 is a block diagram showing a configuration of ramjet engine containing a regeneration cooler according to a first embodiment of the present invention. In FIG. 1, the whole ramjet engine is referred to by a reference numeral 100. Note that an XYZ rectangular coordinate system is introduced to define directions in the following description.

The ramjet engine 100 contains a tank 1, a regeneration cooler 2 and a combustion chamber forming member 3 (e.g. a cowl), and a fuel injector 4. The regeneration cooler 2 contains a wall surface 2a opposite to the combustion chamber forming member 3. A combustion chamber 5 is formed between the wall surface 2a of the regeneration cooler 2 and the combustion chamber forming member 3. Compressed air is sent into the combustion chamber 5 from upstream.

The tank 1 stores liquid fuel which contains hydrocarbon of a large number of carbons as a main component (for example, jet fuel such as JetA-1 fuel, kerosene and dodecene which contain carbons from 10 to 15, or liquid fuel which contains a combination of them). The liquid fuel is supplied to the regeneration cooler 2 through a first pipe 6. The first pipe 6 connects a fuel discharge port of the tank 1 and a fuel inflow port 2b of the regeneration cooler 2.

The regeneration cooler 2 heats the supplied liquid fuel with the heat from the combustion chamber 5 to generate vaporized fuel, and cools the wall surface 2a facing the combustion chamber 5 with the liquid fuel. The regeneration cooler 2 may be configured to thermally decompose the liquid fuel to carry out fuel reforming. Fuel gas as the vaporized fuel generated by the regeneration cooler 2 is supplied to the fuel injector 4 from the fuel outflow port 2c through a second pipe 7.

The fuel injector 4 is provided for the combustion chamber forming member 3 to inject the fuel gas into a flow of compressed air introduced into the combustion chamber 5. Thus, a mixture gas is formed and combusted inside the combustion chamber 5. The mixture gas is combusted in the combustion chamber 5 to generate a combustion gas. The combustion gas flows to a downstream direction of the combustion chamber 5 and is discharged from the combustion chamber 5. In FIG. 1, the flow of combustion gas is shown by arrow 8. In the configuration of FIG. 1, the direction into which combustion gas flows is a +X direction.

Figure 2:
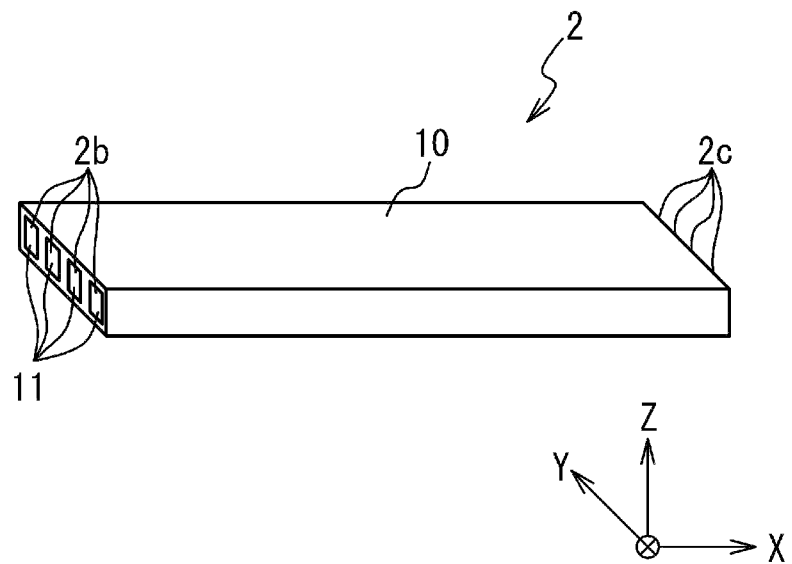
FIG. 2 is a perspective view schematically showing the regeneration cooler.

FIG. 2 is a perspective view schematically showing the regeneration cooler 2. The regeneration cooler 2 has a passage forming structure 10 having fuel passages 11. The fuel passage 11 is formed to communicate from the fuel inflow port 2b to the fuel outflow port 2c. In an example of FIG. 2, the four fuel passages 11 are provided for the passage forming structure 10. However, the number of fuel passages 11 is optional. The fuel passages 11 are arranged in line in a +Y direction and are formed to extend to the +X direction.

Figure 3:
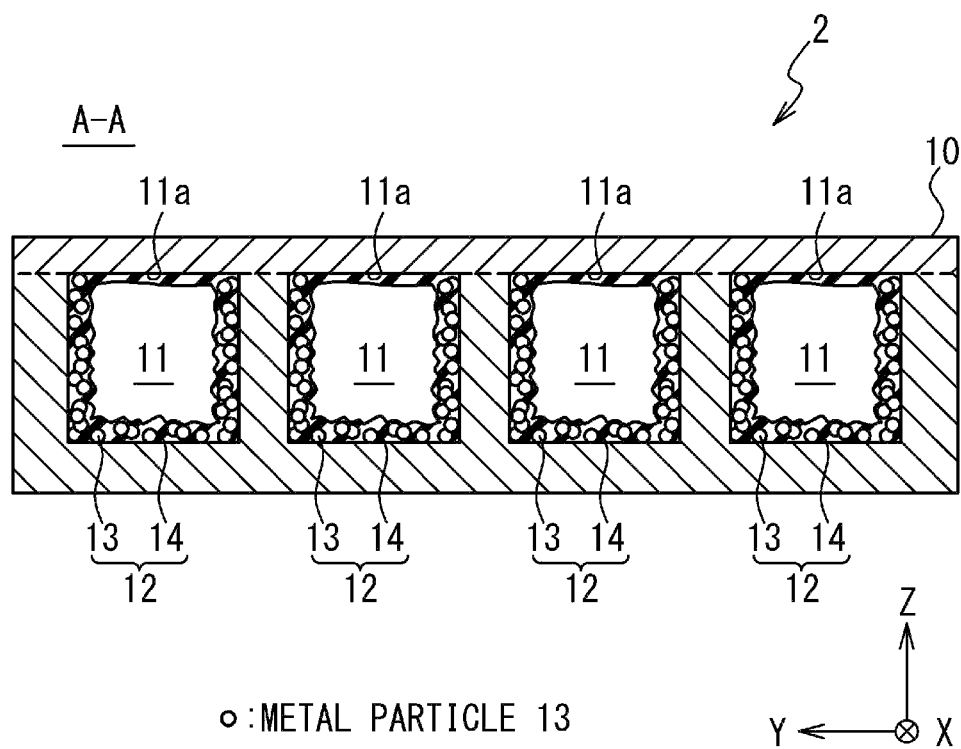
FIG. 3 is a cross sectional view showing a structure of regeneration cooler in a first embodiment.

FIG. 3 is a cross sectional view showing the structure of regeneration cooler 2 in the first embodiment along the A-A line of FIG. 1. In the regeneration cooler 2 of the present embodiment, a coating 12 is formed on a wall surface 11a of the fuel passage 11 to at least partially cover the wall surface 11a. The coating 12 contains metal particles 13 and a coating material film 14. The metal particle 13 is adhered and fixed to the wall surface 11a of the fuel passage 11. In an example, the metal particle 13 is formed of the same material as the passage forming structure 10. For example, when the passage forming structure 10 is formed of Ni-based alloy, the metal particle 13 may be also formed of the Ni-based alloy. It is desirable to form the metal particle 13 of same material as that of the passage forming structure 10, in order to improve the certainty of adhesion and fixation of the metal particles 13 to the wall surface 11a.

Moreover, the coating material film 14 is formed to at least partially cover the metal particles 13 and the wall surface 11a. The coating material film 14 is used to control the progress of thermal decomposition reaction in the fuel passage 11.

In such a structure, since the coating 12 contains the metal particles 13, the adhesion of the coating 12 onto the wall surface 11a of the fuel passage 11 is improved, so that it is possible to improve the certainty of forming the coating 12. The structure is shown in FIG. 1 in which the coating material film 14 completely covers the metal particles 13 and the wall surface 11a. However, the coating material film 14 may be configured to partially cover the metal particles 13 and the wall surface 11a. Even in such a structure, it is possible to control the progress of thermal decomposition reaction.

As the coating material film 14, a material to control the progress of thermal decomposition reaction of the liquid fuel is used. For example, when the progress of thermal decomposition reaction should be restrained, it is desirable that the coating material film 14 contains a material which restrains the progress of thermal decomposition reaction, or is formed of the material which restrains the progress of thermal decomposition reaction, compared with the material of the passage forming structure 10. Such a material is, for example, silica ($SiO_2$), alumina ($Al_2O_3$), zirconia ($ZrO_2$) and oxide having oxygen storage capacity (OSC). In order to restrain the progress of thermal decomposition reaction, it is desirable that the coating material film 14 contains at least one of silica ($SiO_2$), alumina ($Al_2O_3$) and zirconia ($ZrO_2$), and it is more desirable that the coating material film 14 is formed of at least one selected from among silica ($SiO_2$), alumina ($Al_2O_3$) and zirconia ($ZrO_2$).

On the other hand, when the progress of thermal decomposition reaction should be promoted (that is, when the fuel reforming should be carried out aggressively), it is desirable that the coating material film 14 contains catalyst. The catalyst is, for example, a zeolite-based catalyst such as H-ZSM-5, PGM (Platinum Group Metal) catalyst such as platinum catalyst, palladium catalyst, and rhodium catalyst, and oxide catalyst with a large surface area. Especially, when the coating material film 14 contains the catalyst having oxygen storage capacity (OSC), caulking can be restrained. The catalyst having the oxygen storage capacity is, for example, a cerium oxide compound, praseodymium oxide compound, and lanthanoid oxysulfate.

Figure 4:
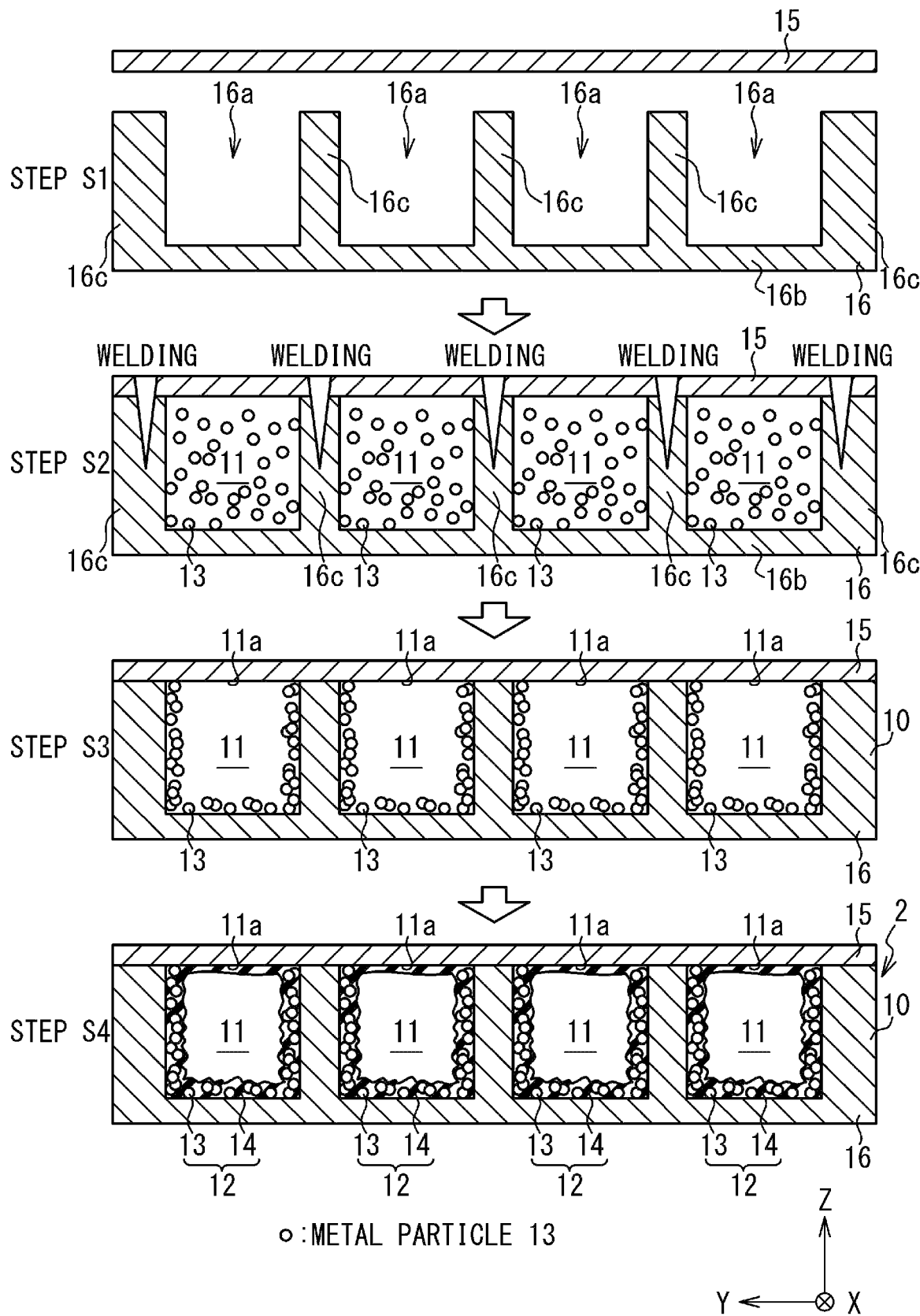
FIG. 4 is a cross sectional view showing a method of manufacturing the regeneration cooler in the first embodiment.

Next, a method of manufacturing the regeneration cooler 2 in the present embodiment will be described. FIG. 4 is cross sectional views showing the method of manufacturing the regeneration cooler 2 in the first embodiment.

First, a metal plate 15 and a metal plate 16 having a plurality of ditches 16a formed are prepared (Step S1). The metal plates 15 and 16 are members used to configure the above-mentioned passage forming structure 10, and are formed of Ni-based alloy. The metal plate 16 has a proximal section 16b and wall sections 16c joined to the proximal section 16b. The ditch 16a is formed between the adjacent wall sections 16c.

Subsequently, the plate 15 is welded to the wall sections 16c of the plate 16 in the condition that the metal particles 13 are put in the ditches 16a (Step S2). The welding of the metal plate 15 with the metal plate 16 is carried out by, for example, electron beam welding (EBW). Since the metal plate 15 is welded with the wall sections 16c of the metal plate 16, the ditches 16a are closed by the metal plate 15. Thus, the passage forming structure 10 is formed in which the fuel passages 11 have been formed thereinside.

When the metal plate 15 is welded with the metal plate 16, the temperatures of metal plates 15 and 16 rise due to heat upon welding, so that at least a part of the metal particles 13 put inside the ditch 16a is adhered and fixed to the metal plates 15 and 16. When the metal particles 13 and the metal plates 15 and 16 are formed of the Ni-based alloy, the metal particles 13 adhered and fixed to the metal plates 15 and 16 at about 1000° C. This temperature is feasible due to the heat by the welding. A part of of metal particles 13 which is not adhered or fixed to the metal plates 15 and 16 is removed (Step S3). Through these steps, the passage forming structure 10 is formed in which the metal particle 13 are adhered or fixed to the wall surfaces 11a of the fuel passages 11

In the welding at step S2, it is not necessary that the ditch 16a is fully filled with the metal particles 13. The metal particles 13 may be put in the ditch 16a to occupy only a part of the ditch 16a.

Moreover, the coating material film 14 is formed to at least partially cover the wall surface 11a of the fuel passage 11 and the metal particles 13. Thus, the structure is formed in which the wall surface 11a is covered with the coating 12 (Step S4). The forming of coating material film 14 may be carried out by passing slurry containing a raw material of the coating material film 14 through the fuel passage 11 to apply the slurry on the wall surface 11a, and then carrying out a sintering. Thus, the method of manufacturing the regeneration cooler 2 in this embodiment completes.

As mentioned above, various materials can be used as the coating material film 14. For example, when the progress of thermal decomposition reaction should be restrained, it is desirable that the coating material film 14 contains a material restraining the progress of thermal decomposition reaction, compared with the material of the passage forming structure 10, or is formed of the material restraining the progress of thermal decomposition reaction. On the other hand, when the progress of thermal decomposition reaction should be promoted (that is, when the fuel reforming should be carried out aggressively), it is desirable that the coating material film 14 contains catalyst.

According to the structure and manufacturing method of the regeneration cooler 2 in the first embodiment, because the coating 12 contains the metal particles 13 adhered and fixed to the fuel passage 11, it is possible to improve the certainty of forming the coating 12 having a function to control the progress of thermal decomposition reaction.

Second Embodiment

Figure 5:
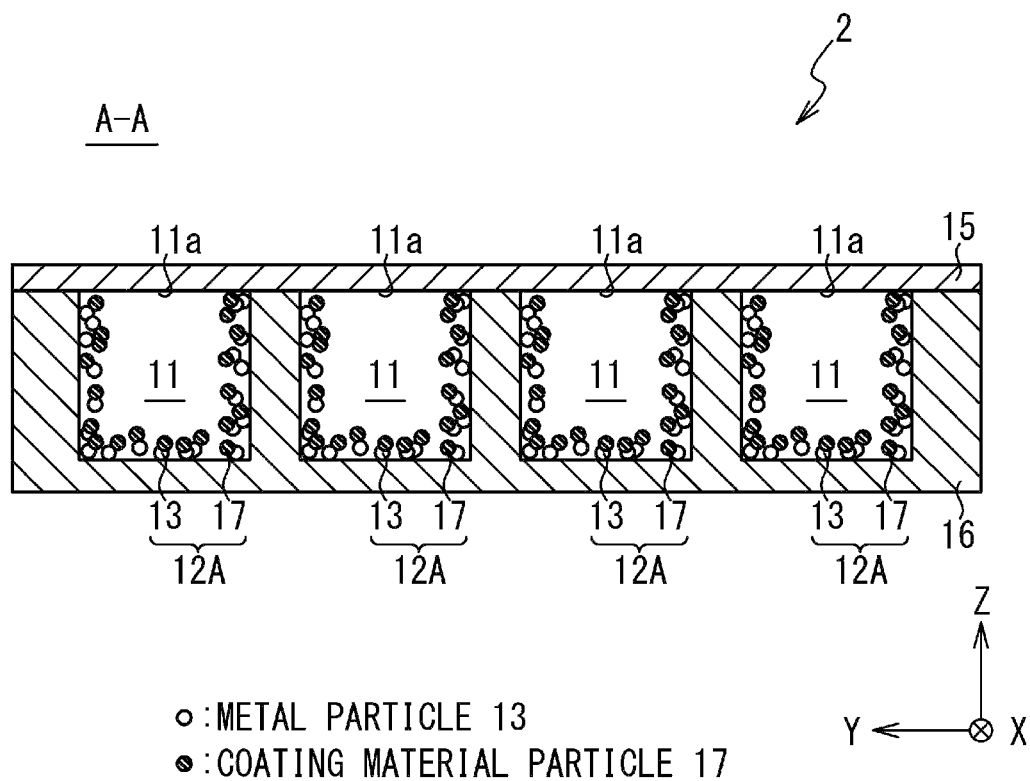
FIG. 5 is a cross sectional view showing a structure of regeneration cooler in a second embodiment.

FIG. 5 is a cross sectional view showing the structure of regeneration cooler 2 in the second embodiment. The structure of regeneration cooler 2 in the second embodiment along the A-A line of FIG. 1 is shown in FIG. 5.

In the second embodiment, a coating 12A is formed on the wall surface 11a of the fuel passage 11 to at least partially cover the wall surface 11a. In the present embodiment, the coating 12A contains the metal particles 13 and coating material particles 17. The metal particles 13 and the coating material particles 17 are mutually adhered and fixed to the wall 11a.

In an example, the metal particle 13 is formed of the same material as that of the passage forming structure 10. For example, when the passage forming structure 10 is formed of Ni-based alloy, the metal particle 13 may be also formed of the Ni-based alloy. It is desirable that the metal particle 13 is formed of the same material as that of the passage forming structure 10, in order to improve the certainty of adhesion and fixture of the metal particle 13 to the wall surface 11a.

The coating material particle 17 is formed of a material of controlling the progress of thermal decomposition reaction of the liquid fuel. For example, when the progress of thermal decomposition reaction should be restrained, it is desirable that the coating material particle 17 contains a material which restrains the progress of thermal decomposition reaction, or that the coating material particle 17 is formed of the material which restrains the progress of thermal decomposition reaction, compared with the material of the passage forming structure 10. Such a material is, for example, silica ($SiO_2$), alumina ($Al_2O_3$), zirconia ($ZrO_2$) and oxide having oxygen storage capacity (OSC). To restrain the progress of thermal decomposition reaction, it is desirable that the coating material film 14 contains at least one of silica ($SiO_2$), alumina ($Al_2O_3$), and zirconia ($ZrO_2$), and it is more desirable that the coating material film 14 is formed of at least one material selected from among silica ($SiO_2$), alumina ($Al_2O_3$) and zirconia ($ZrO_2$).

On the other hand, when the progress of thermal decomposition reaction should be promoted (that is, when the fuel reforming should be carried out aggressively), it is desirable that the coating material particle 17 contains catalyst. The catalyst is, for example, zeolite catalyst such as H-ZSM-5, PGM (Platinum Group Metal) catalyst such as platinum catalyst, palladium catalyst and rhodium catalyst, and oxide catalyst having a large surface area. Especially, when the coating material film 14 contains a catalyst having oxygen storage capacity (OSC), caulking can be restrained. The catalyst having oxygen storage capacity is, for example, cerium oxide compound, praseodymium oxide compound, lanthanoid oxysulfate.

Figure 6:
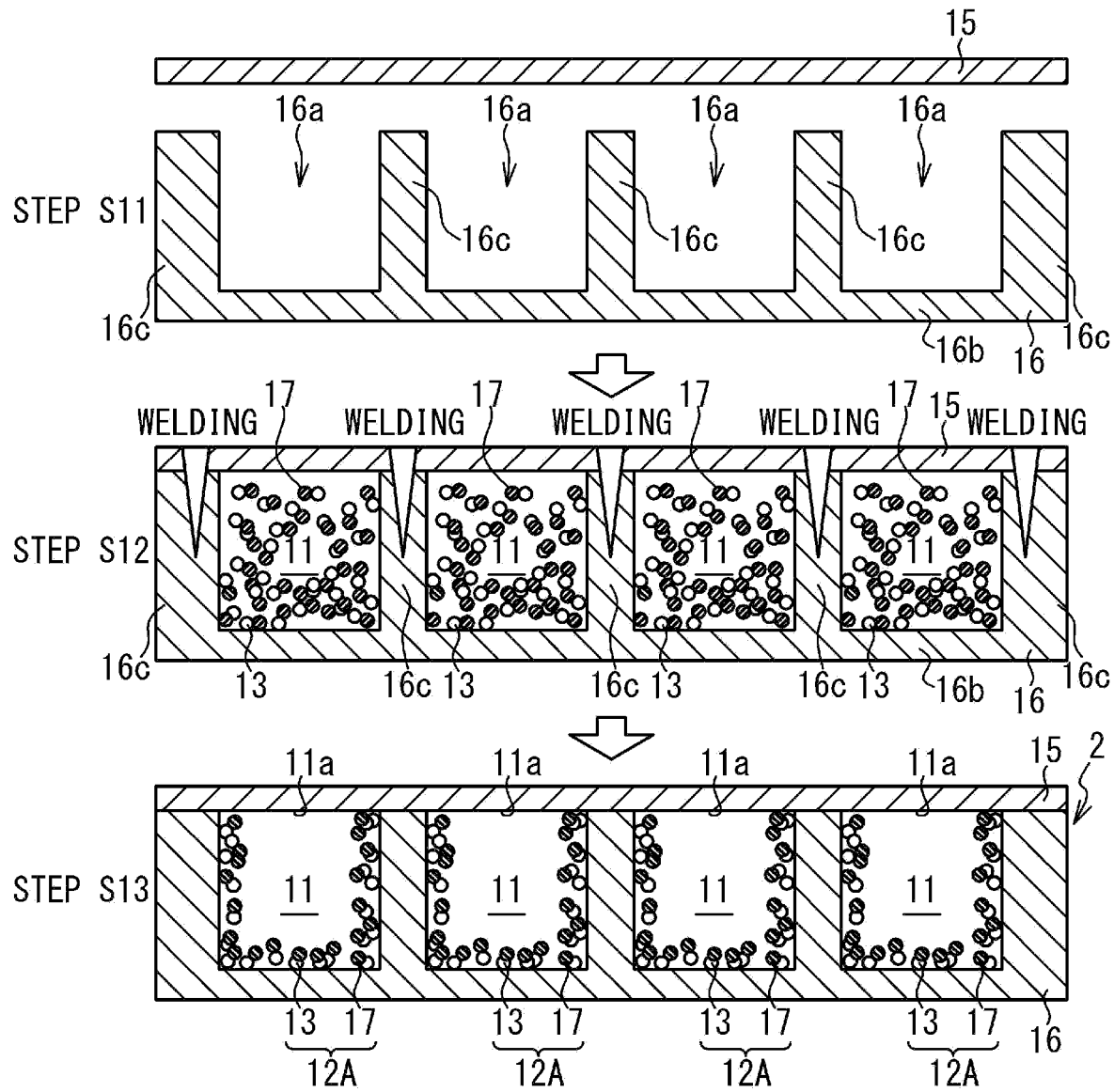
FIG. 6 is a cross sectional view showing the method of manufacturing the regeneration cooler in the second embodiment.

Next, a method of manufacturing the regeneration cooler 2 in the second embodiment will be described. FIG. 6 is cross section views showing a manufacturing method of the regeneration cooler 2 in the second embodiment.

Like the first embodiment, the metal plate 15 and the metal plate 16 having the plurality of ditches 16a are prepared (Step S11). The metal plates 15 and 16 are the members used to form the above-mentioned passage forming structure 10, and for example, formed of Ni-based alloy. The metal plate 16 has the proximal section 16b and the wall sections 16c joined to the proximal section 16b. The ditch 16a is formed between the adjacent wall sections 16c.

Next, the metal plate 15 is welded with the wall sections 16c of the plate 16 in the condition that the metal particles 13, the coating material particles 17 and a binder are put in the ditch 16a (Step S12). The welding of the metal plate 15 with the metal plate 16 is carried out by, for example, electron beam welding (EBW). The ditch 16a is closed by the metal plate 15 by welding the metal plate 15 with the wall sections 16c of the metal plate 16. Thus, the passage forming structure 10 is formed in which the fuel passages 11 are is formed inside the structure 10.

When the metal plate 15 is welded with the metal plate 16, the temperatures of metal plates 15 and 16 rise due to heat upon the welding, so that the at least a part of the metal particles 13 put inside the ditch 16a is adhered and fixed to the metal plates 15 and 16. When the metal particles 13 and the metal plates 15 and 16 are formed of Ni-based alloys, the metal particles 13 adhere and fix to the metal plates 15 and 16 at about 1000° C. This temperature is feasible due to heat by the welding.

The binder is used to adhere and fix the coating material particles 17 to the wall surface 11a of the fuel passage 11. As the binder,
Metal hydroxide such as a powder of zirconium hydroxide and aluminum hydroxide is used. The binder of metal hydroxide decomposes to oxide due to heat by the welding. Thus, the coating material particles 17 can be surely adhered and fixed to the wall surface 11a of the fuel passage 11. A part of the coating material particles 17 is adhered and fixed directly to the wall surface 11a of the fuel passage 11 and the other part is adhered and fixed indirectly to the wall surface 11a through the metal particles 13 and the other coating material particles 17.

Also, in the welding at the step S12, it is not necessary to fully fill the ditch 16a with the metal particles 13, the coating material particles 17 and the binder. The metal particles 13, the coating material particles 17 and the binder may be put in the ditch 16a to occupy only a part of the ditch 16a.

A part of the metal particles 13 and the coating material particles 17 which is not adhered and fixed to the metal plates 15 and 16 is removed (Step S13). Through such a step, the coating 12A containing the metal particles 13 and the coating material particles 17 is formed to partially cover the wall surface 11a of the fuel passage 11 at least.

According to the structure and manufacturing method of the regeneration cooler 2 in the present embodiment, because the coating 12A contains the metal particles 13 adhered and fixed to the fuel passage 11 in addition to the coating material particles 17, it is possible to improve the certainty of forming the coating 12A having a function of controlling the progress of thermal decomposition reaction.

In the above, the embodiments of the present invention have been specifically described. However, the present invention is not limited to the above-mentioned embodiments. It would be understood by a skilled person that the present invention can be implemented together with various changes or modifications. Also, it is possible for the technique in one embodiment to be applied to another embodiment.

The present application is based on Japanese Patent Application No. JP 2017-077377, filed on Apr. 10, 2017, and claims a priority based on Japanese Patent Application. The disclosure thereof is incorporated herein by reference.

The invention claimed is:

1. A method of manufacturing a regeneration cooler of a ramjet engine the regeneration cooler comprising a plurality of fuel passages through which liquid fuel comprising hydrocarbon flows, the method comprising:
    preparing a first metal plate;
    preparing a second metal plate which has a proximal section, a plurality of wall sections connected with the proximal section, and a plurality of ditches configured such that one ditch is formed between every adjacent two of the plurality of wall sections;
    disposing metal particles, coating material particles, and a binder in each of the ditches, wherein the coating material particles comprise a material that controls a thermal decomposition reaction of the hydrocarbon of the liquid fuel;
    after the disposing of the metal particles, the coating material particles and the binder in the ditches, arranging the first metal plate on the second metal plate so as to close the ditches with the first metal plate;
    after the arranging of the first metal plate, welding the first metal plate with the wall sections of the second metal plate to form the fuel passages by closing the ditches with the first metal plate, wherein part of the metal particles in each ditch are adhered and fixed to wall surfaces of the fuel passages by heat caused by the welding; and
    removing part of the metal particles and the coating material particles which are not adhered and fixed to the wall surfaces of the fuel passages formed by closing the ditches by the first metal plate.

2. A method of manufacturing a regeneration cooler of a ramjet engine, the regeneration cooler comprising a plurality of fuel passages through which liquid fuel comprising hydrocarbon flows, the method comprising:
    preparing a first metal plate;
    preparing a second metal plate which has a proximal section, a plurality of wall sections connected with the proximal section, and a plurality of ditches configured such that one ditch is formed between every adjacent two of the plurality of wall sections;
    disposing metal particles in each of the ditches;
    after the disposing of the metal particles in each of the ditches, arranging the first metal plate on the second metal plate so as to close the ditches with the first metal plate;
    after the arranging of the first metal plate, welding the first metal plate with the wall sections of the second metal plate to form the fuel passages by closing the ditches with the first metal plate, wherein part of the metal particles in each ditch are adhered and fixed to wall surfaces of the fuel passages by heat caused by the welding; and
    forming a coating material to at least partially cover the wall surfaces of the fuel passages and the metal particles adhered and fixed to the wall surfaces, the coating material controlling a thermal decomposition reaction of the hydrocarbon of the liquid fuel.

3. The method of manufacturing a regeneration cooler according to claim 2, wherein the coating material contains a material which restrains thermal decomposition reaction of liquid fuel, compared with materials of the first metal plate and the second metal plate.

4. The method of manufacturing a regeneration cooler according to claim 2, wherein the coating material contains at least one of silica, alumina and zirconia.

5. The method of manufacturing a regeneration cooler according to claim 2, wherein the coating material contains a catalyst which promotes thermal decomposition reaction of liquid fuel.

6. The method of manufacturing a regeneration cooler according to claim 2, wherein the metal particles are formed of a same material as that of the first metal plate and the second metal plate.

* * * * *